(12) United States Patent
Malone

(10) Patent No.: US 7,333,830 B2
(45) Date of Patent: Feb. 19, 2008

(54) METHOD AND APPARATUS FOR SYNCHRONIZING WLAN IN A MULTI-MODE RADIO SYSTEM

(75) Inventor: Lawrence Jarrett Malone, Carlsbad, CA (US)

(73) Assignee: Quorum Systems, Inc., San Diego, CA (US)

( * ) Notice: Subject to any disclaimer, the term of this patent is extended or adjusted under 35 U.S.C. 154(b) by 125 days.

(21) Appl. No.: 11/069,587

(22) Filed: Feb. 28, 2005

(65) Prior Publication Data

US 2006/0068837 A1     Mar. 30, 2006

Related U.S. Application Data

(60) Provisional application No. 60/551,343, filed on Mar. 10, 2004, provisional application No. 60/547,817, filed on Feb. 26, 2004.

(51) Int. Cl.
*H04M 1/00* (2006.01)

(52) U.S. Cl. ............................... 455/552.1; 455/553.1; 455/78; 455/88

(58) Field of Classification Search ............. 455/435.2, 455/500, 501, 63.1, 67.13, 68, 552.1, 78, 455/553.1, 88; 370/229, 338; 340/310.01
See application file for complete search history.

(56) References Cited

U.S. PATENT DOCUMENTS 7,142,882 B2 * 11/2006 Schmidt ................... 455/552.1

| | | | | |
|---|---|---|---|---|
| 2002/0136183 A1 * | 9/2002 | Chen et al. | ................. | 370/338 |
| 2003/0125019 A1 | 7/2003 | Bajikar | | |
| 2003/0222818 A1 * | 12/2003 | Regnier et al. | ............. | 342/383 |
| 2004/0029612 A1 * | 2/2004 | Gorsuch | ................. | 455/552.1 |
| 2004/0242159 A1 * | 12/2004 | Calderon et al. | .......... | 455/63.3 |

FOREIGN PATENT DOCUMENTS

EP     1119137 A     7/2001

* cited by examiner

*Primary Examiner*—George Eng
*Assistant Examiner*—Nam Huynh
(74) *Attorney, Agent, or Firm*—Townsend and Townsend and Crew

(57) ABSTRACT

Methods and apparatus for synchronizing Wireless Local Area Network (WLAN) communication within a multi-mode radio. A multi-mode radio can support communication with a WLAN and at least one other wireless communication system. The multiple systems can be distinct and asynchronous. Transmitting, or attempting to transmit, over a WLAN communication link can result in interference that degrades the sensitivity of a receiver in another communication system, or that interferes with a transmission in another communication system. The WLAN transmissions can be synchronized to operation in another communication system by generating a signal that can be coupled to a collision avoidance system in the WLAN transmitter. The signal can operate to cause the WLAN transmitter to reschedule the transmission to another time such that the resources of the multi-mode radio are conserved and the WLAN interference is minimized.

25 Claims, 6 Drawing Sheets

METHOD AND APPARATUS FOR SYNCHRONIZING WLAN IN A MULTI-MODE RADIO SYSTEM

CROSS-REFERENCES TO RELATED APPLICATIONS

This application claims the benefit of U.S. Provisional Application No. 60/547,817, filed Feb. 26, 2004, entitled "METHOD FOR SYNCHRONIZING WLAN IN A MULTI-MODE RADIO SYSTEM," and U.S. Provisional Application No. 60/551,343, filed Mar. 10, 2004, entitled "METHOD FOR SYNCHRONIZING WLAN IN A MULTI-MODE RADIO SYSTEM USING BARKER CODE CORRELATION," each of which is hereby incorporated herein by reference in its entirety.

BACKGROUND OF THE DISCLOSURE

Conventional practice is to design a radio transceiver targeted to a particular standard. For example, a radio transceiver to be used in a device that operates using the Bluetooth™ communication protocol is typically sized and customized to the Bluetooth protocol. Generally the same can be said for radio transceivers designed for use in devices that operate using the IEEE 802.11 communication protocol.

Historically, a user that is interested in communicating in particular systems operates a distinct device dedicated to each of the communication protocols. The user is required to have multiple devices, with each device limited to communicating over a particular communication system using a particular communication protocol.

However, there is a trend in many applications that a communication device operates multiple communication protocol technologies, or operates multiple instances of the same communication protocol technology. Communication devices are continually shrinking in physical size and simultaneously increasing the ability to communicate over multiple communication systems each having a corresponding communication protocol. A multi-mode communication device can be configured to support communications over a Wireless Local Area Network (WLAN) as well as communications over a wide area network, such as a wireless telephone network. For example, a multi-mode communication device such as a cellular telephone device may include IEEE 802.11 WLAN and Bluetooth functionality along with GSM functionality.

The term WLAN typically refers to a class of wireless communication technology that operates at a distance up to 100 meters, and WPAN is commonly used to refer to a class of wireless communication technology that operates up to a distance of 10 meters. For simplicity, when used herein, the term WLAN is meant to encompass at least systems operating in accordance with standards such as IEEE 802.11/DS, 802.11a, 802.11b, and 802.11g. It should not be limited to these technologies as any other shorter-range wireless communication technology, particularly, but not limited to, those that do not require a license for operation by the Federal Communications Commission (FCC) in the United States (U.S.) and other similar unlicensed bands outside of the U.S.

Wireless telephone networks can operate according to a variety of communication standards and corresponding communication protocols. Wireless telephone systems include, but are not limited to, those systems operating in accordance with GSM, GPRS, EDGE, AMPS, CDMA and WCDMA standards.

While it is desirable to provide a radio transceiver system that can be used for more than one communication protocol technology, supporting multiple communication standards in a single device creates additional issues and design effects that need to be addressed. One drawback to a multi-mode device approach is that one sub-system can interfere with another sub-system since they are not synchronized to one another.

The different communication systems are rarely synchronized with one another, and can operate at different frequencies, bandwidths, and communication rates. The lack of synchronization between communication systems can create interference problems within a multi-mode communication device. For example, if a first sub-system in a multi-mode communication device transmits while a second sub-system within the multi-mode communication device attempts to receive, the first sub-system's transmission can leak into the second sub-system's receiver, thus blocking or otherwise degrading any incoming messages intended for the second sub-system.

One manner of reducing the effects of interference generated by a first sub-system on the operation of a second sub-system is to increase the isolation between the separate sub-systems. Expensive isolation techniques such as filtering can be used to improve this unsynchronized multi-mode performance. However, there are limits to the ability to isolate a first sub-system from a second sub-system integrated within a single device. The continual desire to minimize the overall device size and weight further complicates the attempts to isolate various sub-systems. It is therefore necessary to develop technologies that configure multiple transceivers within a unified multi-mode communication device such that the transceivers for the distinct communication systems minimally interfere with one another during transmission and receptions.

BRIEF SUMMARY OF THE DISCLOSURE

Methods and apparatus for synchronizing WLAN communication within a multi-mode radio are disclosed. A multi-mode radio can support communication with a WLAN and at least one other wireless communication system. The multiple systems can be distinct and asynchronous. Transmitting, or attempting to transmit, over a WLAN communication link can result in interference that degrades the sensitivity of a receiver in another communication system, or that interferes with a transmission in another communication system. The WLAN transmissions can be synchronized to operation in another communication system by generating a signal that can be coupled to a collision avoidance system in the WLAN transmitter. The signal can operate to cause the WLAN transmitter to reschedule the transmission to another time such that the resources of the multi-mode radio are conserved and the WLAN interference is minimized.

The disclosure includes a method of controlling a multi-mode wireless communication device. The method includes generating an energy signal in a first sub-system of the multi-mode wireless communication device, the first sub-system configured to enable the multi-mode wireless communication device to communicate with a first wireless communication system and coupling the energy signal to a receive signal path of a WLAN sub-system within the multi-mode wireless communication device to control the multi-mode wireless communication device, the WLAN sub-system implementing collision avoidance.

The disclosure also includes a method of controlling a multi-mode wireless communication device that includes determining a time that a first sub-system is active, the first sub-system configured to enable the multi-mode wireless communication device to communicate with a first wireless communication system, generating an energy signal in a baseband portion of the first sub-system during at least a portion of the time that the first sub-system is active, the energy signal configured to exceed a predetermined Clear Channel Assessment (CCA) threshold, and coupling the energy signal to a receive signal path of a baseband portion of a WLAN sub-system within the multi-mode wireless communication device to control the multi-mode wireless communication device, the WLAN sub-system implementing collision avoidance based on the CCA threshold.

The disclosure also includes a multi-mode wireless communication apparatus. The apparatus includes a radio portion, a WLAN baseband portion coupled to the radio portion and configured to determine a transmit channel availability using a CCA mechanism, and a sub-system baseband portion coupled to the radio portion and configured to support communications over a wireless communication system, the sub-system baseband portion distinct from the WLAN baseband portion, and configured to determine a time that communications with the wireless communication system is active, generate an energy signal during at least a portion of the time that communications with the wireless communication system is active, and couple the energy signal to a receive input of the WLAN baseband portion.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE DISCLOSURE

Figure 1:
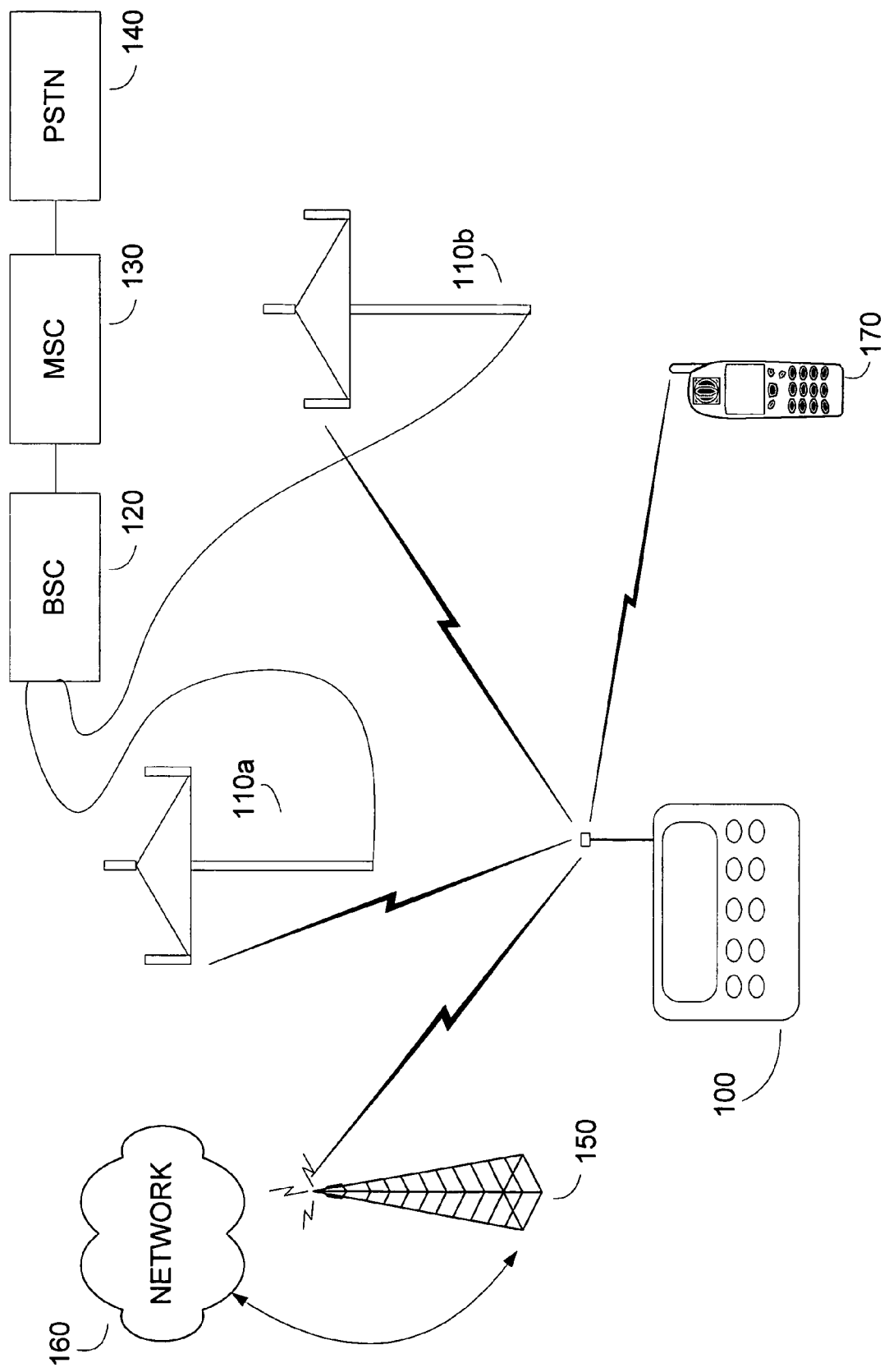
FIG. 1 is a simplified functional block diagram of an embodiment of a multi-mode radio in communication with multiple communication systems.

Methods and apparatus for synchronizing communications in a multi-mode wireless communication device are disclosed herein. The multiple communication systems supported by the multi-mode communication device can be asynchronous and can operate at different frequencies using different communication protocols.

The multi-mode communication device can include a composite RF front end that can be configured to support multiple configurations corresponding to each of the supported communication systems, or the multi-mode communication device can include multiple RF front end portions, where each of the multiple RF front end portions supports a subset of the total number of communication systems supported by the multi-mode communication device.

Similarly, the multi-mode communication device can include a single composite baseband processor configured to support all of the communication systems, or can include multiple baseband processors, with each of the multiple baseband processors configured to support a subset of the total number of communication systems supported by the multi-mode communication device. Each of the one or more baseband processors can be coupled to one or more corresponding RF front end portions.

The multi-mode communication device can be configured such that at least one supported communication system corresponds to a WLAN, such as an IEEE 802.11 compliant communication system. Therefore, at least one combination of RF front end portion and baseband processor is configured to support WLAN communications.

In a WLAN, wireless communication links are used as a transmission medium to exchange data between various stations. Some of these stations can be WLAN access points that can act as a central communication hub through which all other stations must pass their information. Due to the nature of wireless communications, it is difficult to physically detect a collision event when multiple stations transmit data frames at the same time. As a result, a typical WLAN protocol requires each frame transmission to be acknowledged by the receiver. In response to a received DATA frame, the destination device transmits an acknowledgement (ACK) frame, which indicates to the original transmitter that the DATA frame was received without errors. Accordingly, the transmitter assumes that no collision event occurred during the DATA frame transmission if the ACK is received. If the ACK frame is not received, the transmitter assumes that some collision event caused the DATA frame to be lost. In this case, the transmitter will retransmit the DATA frame.

In contrast to wired devices, stations of a wireless network typically cannot listen to their own transmission, and are therefore unable to employ medium access control schemes such as Carrier Sense Multiple Access with Collision Detection (CSMA/CD) in order to prevent simultaneous transmission on the channel. Instead, WLAN communication devices, such as those that operate in accordance with the IEEE 802.11 standard, can implement a Carrier Sense Multiple Access with Collision Avoidance (CSMAICA) mechanism, using a randomized exponential back off rule to minimize the likelihood of transmission collision.

In a CSMA/CA scheme of a WLAN communication system, before transmitting, a communication device will turn on or otherwise activate its receiver and listen for other transmissions within the communication system. In one embodiment, the WLAN receiver can be configured to measure the energy in the communication channel. If the energy measurement is above a predetermined threshold, the communication device can conclude that another device is transmitting on the channel and that the WLAN communication device should postpone its transmission until some later time when the channel will be free. If the energy measurement is below the threshold, the communication device can conclude the channel is clear and can proceeds with the transmission.

One or more of the sub-systems in the multi-mode communication device can be configured to support a communication system distinct from the WLAN communication system. The sub-system can minimize the interference generated by a WLAN transmission generated within the multi-mode communication device by synchronizing the WLAN transmissions to occur during a time that the sub-system is not expected to receive a signal or during a time that the sub-system is idle. The sub-system can synchronize the WLAN transmission by exploiting the CSMA/CA scheme implemented by the WLAN transmitter.

The sub-system can generate an energy signal and couple the energy signal to an input port of the WLAN system that causes the WLAN transmitter to determine that the channel is busy and reschedule the transmission. The sub-system can generate the energy signal at RF or baseband frequencies. However, it may be advantageous to generate the energy signal at baseband frequencies because the CSMA/CA scheme is typically implemented in the baseband processor for the WLAN communication portion. Thus, the sub-system can generate an energy signal and couple the energy signal to an input of the WLAN baseband processor when the sub-system desires the WLAN transmitter to reschedule its transmissions.

The sub-system can be configured to generate an energy signal that is a predetermined sequence, a random, sequence, or a pseudorandom sequence. The sub-system can further be configured to generate an energy signal that has properties of a WLAN signal.

For example, a WLAN signal may be spread or modulated by a predetermined sequence, or may include a predetermined header or preamble sequence. The sub-system can be configured to generate an energy signal having the spreading sequence or including a predetermined preamble or header sequence to emulate a WLAN signal occupying the channel.

In a particular example, a WLAN receiver operating in accordance with some of the IEEE 802.11 standards can correlate received signals with a predetermined pseudorandom sequence that is a Barker Spreading Sequence. Each bit of an 802.11b transmission is spread by a Barker Sequence, and a WLAN device can determine if another WLAN device is transmitting by correlating the incoming signal by this sequence. Likewise, in 802.11b/g transmissions, the header and preamble bits of a transmission are spread using a Barker sequence. The signal correlation can be used to allow the WLAN device to distinguish between background noise and a competing WLAN transmission. If the Barker correlation measurement is above a predetermined threshold, then the WLAN communication device can conclude that another WLAN device is transmitting on the channel. The WLAN communication device can postpone its transmission until some later time when the channel will be free. If the Barker correlation measurement is below the threshold, the WLAN communication device can conclude the channel is clear and can proceed with the transmission.

Therefore, in a multi-mode communication device in which one of the sub-systems is a WLAN communication device configured to determine competing WLAN transmissions by correlating the input signal to a Barker sequence, another sub-system can synchronize the WLAN transmitter to delay its transmission by generating an energy having the Barker sequence and coupling the energy signal to an input of the WLAN sub-system.

FIG. 1 is a simplified functional block diagram of a communication environment having multiple distinct communication systems and a multi-mode communication device configured to synchronize a WLAN transmission in accordance with the methods disclosed herein. The multi-mode communication device can be referred to alternatively as a user terminal 100, mobile terminal, user device, portable device, mobile station, or some other device. Additionally, the user terminal 100 need not be a portable device but may instead be a stationary device.

In FIG. 1, the user device 100 is shown as communicating with three distinct terminals corresponding to three distinct communication systems. However, the disclosure is not limited to communications with three communication systems, but is applicable to any number of communication systems having any number of different communication protocols.

In the embodiment of FIG. 1, the user device 100 is configured to communicate with a first communication system, which may be a wireless telephone system such as a GSM telephone system, a second communication system, which may be a wireless local area network (WLAN) such as an IEEE 802.11 network, and a third communication system, which may be a Pico or Personal Area Network (PAN) such as a Bluetooth network. In the above example, each of the communication systems can be a time multiplex or packet data communication system and the user device 100 can be configured to concurrently communicate with the communication systems by time multiplexing a single RF section.

The user device 100 can be configured to communicate with a first communication system, which may be a GSM wireless telephone system. The user device 100 can communicate with one or more base stations 110a and 110b, which are coupled to one or more base station controllers 120. In the embodiment of FIG. 1, two base stations 110a and 110b are shown coupled to the same base station controller 120, although such a configuration is not a requirement. The base station controller 120 can be coupled to a mobile station controller 130 which in turn can be coupled to a public switched telephone network (PSTN) 140. The first communication system is a two way communication system and the user device 100 can be configured to both transmit and receive information to and from the system.

The user device 100 can be configured to concurrently communicate with a second communication system, which can be a WLAN system. The WLAN system can include one or more access points 150 coupled to a network 160. The network 160 can be any type of communication network, such as a LAN or the Internet. The user device 100 can be configured to communicate with the WLAN using a second communication protocol that is distinct from a first communication protocol used to communicate with the first communication system. For example, the second communication system may be an IEEE 802.11 WLAN and the user device 100 can be configured to communicate with the system according to the IEEE 802.11 standard. The user terminal 100 can be configured to implement a CSMA/CA scheme to avoid collisions when transmitting on the WLAN channel.

The user device 100 can also be configured to concurrently communicate with a third communication system, which may be a PAN such as a Bluetooth network. The user device 100 can be configured to communicate directly with a Bluetooth enabled device 170 for example, the user device 100 can be configured to receive communications from other like configured devices using the Bluetooth communication protocol. Other Bluetooth enabled devices can include kiosks, personal digital assistants, or wireless headsets.

When the user terminal 100 is configured to communicate with a communication system other than the WLAN communication system such as when communicating with a base station 110a of a GSM telephone system, the user terminal 100 can be configured to generate an energy signal and couple the energy to a baseband processor within the user terminal 100 associated with the WLAN system. If the WLAN baseband processor in the user terminal 100 intends to transmit data, it will first listen to the channel to determine if the channel is occupied. The energy signal generated within the user terminal 100 and coupled to the WLAN baseband processor will cause the WLAN baseband processor to determine that the channel is busy and will reschedule the WLAN transmission.

There are no adverse effects in the WLAN sub-system of the user terminal 100 if the WLAN baseband processor does not have any data to transmit during the time the energy signal is coupled to its input. Similarly, the user terminal 100 does not generate the energy signal unless it desires to inhibit the WLAN transmitter. Thus, the WLAN sub-system operates normally in the absence of the energy signal.

Figure 2:
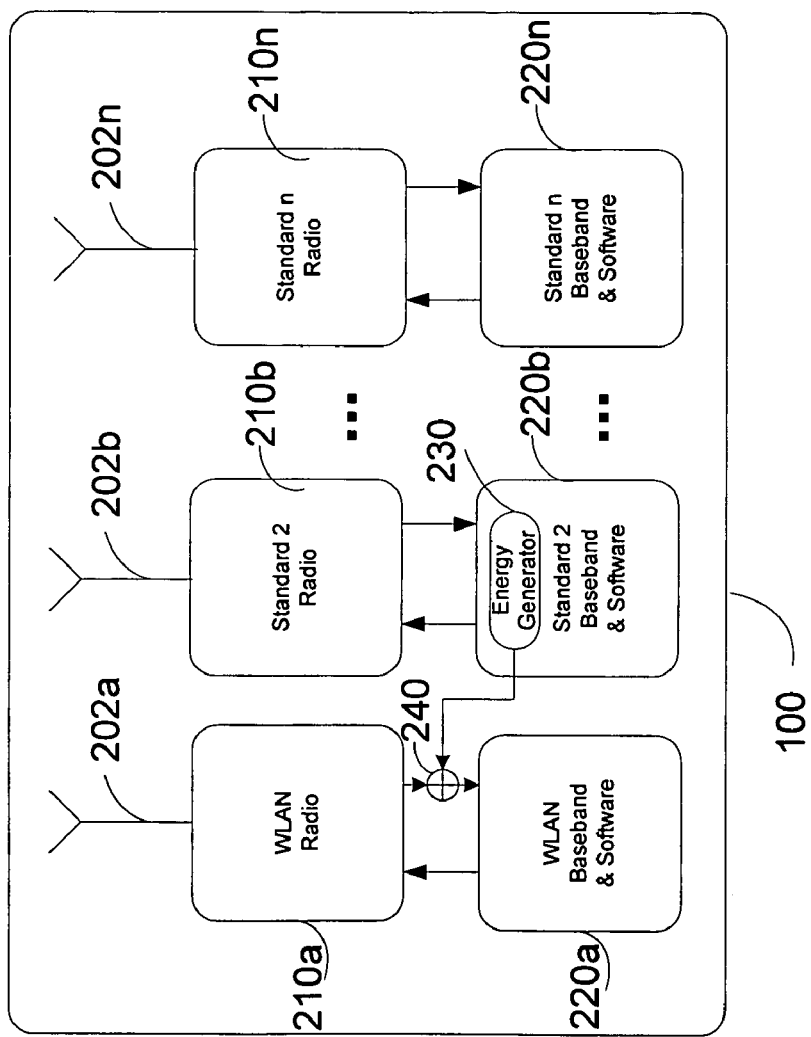
FIG. 2 is a simplified functional block diagram of an embodiment of a multi-mode radio.

FIG. 2 is a simplified functional block diagram of an embodiment of a multi-mode user terminal 100 implementing WLAN synchronization through energy generation. The user terminal 100 can be the multi-mode user terminal shown in FIG. 1.

The multi-mode user terminal 100 includes multiple sub-systems having radio-baseband processor pairs to accommodate the multiple communication protocols. The multi-mode user terminal 100 can includes a first antenna 202a configured for the frequencies of a first communication system, that can be the frequencies assigned to support WLAN communications. The first antenna 202a is coupled to a WLAN radio 210a configured to operate according to a WLAN communication standard. The WLAN radio 210a is coupled to a WLAN baseband processor 220a configured to operate according to the WLAN communication standard. The WLAN baseband processor 220a can encompass all digital and analog baseband functionality required by the WLAN Standards committee for WLAN. The WLAN baseband processor 220a is coupled to the WLAN radio 210a by a digital or analog transmit path and a digital or analog receive signal path. The transmit signal path from the WLAN baseband processor 220a to the WLAN radio 210a can be a direct connection.

The WLAN radio 210a can couple the receive path to the WLAN baseband processor 220a through a signal combiner 240. The baseband signal output from the WLAN radio 210a can be coupled to a first input of a signal combiner 240 and the output of the signal combiner 240 can be coupled to the receive signal input of the WLAN baseband processor 220a. The signal combiner 240 is depicted as a signal summer, but can be any type of device or circuit that can be configured to couple the energy signal to the receive signal path of the WLAN sub-system. The signal combiner 240 can be, for example, a summer, a multiplexer, a coupler, a logical 'OR' gate, and the like, or some other combiner.

The multi-mode user terminal 100 can support additional communication systems by adding additional radios and baseband processors. Therefore, the user terminal 100 can be configured to support a second communication standard using a second antenna 202b coupled to a second radio 210b. The second radio 210b is coupled to a second baseband processor 220b.

The user terminal 100 can be similarly configured to support any number of communication standards by including corresponding sub-systems, where each sub-system includes a corresponding radio and baseband processor. The multi-mode user terminal 100 can support an nth communication standard using an nth antenna 202n coupled to an nth radio 210n. The multi-mode user terminal 100 essentially supports concurrent multiple communications through the use of multiple devices.

At least one of the sub-systems distinct from the WLAN sub-system can include an energy generator 230 configured to generate an energy signal that is coupled to a second input of the signal combiner 240 that has an output coupled to the receive input of the WLAN baseband processor 220a. Although the signal combiner 240 in the embodiment is configured to combine signals from two sources, other embodiments can include additional signals sources, such as energy generators for additional sub-systems.

In the embodiment shown in FIG. 2, the second baseband processor 220b includes an energy generator 230 that has its output coupled to the second input of the signal combiner 240. The energy generator 230 can be configured to generate an energy signal when the second sub-system desires the WLAN sub-system to reschedule its transmissions.

In general, wireless devices communicate to one another by radiating energy. When a WLAN station listens to the channel to determine whether the channel is in-use or not, it is measuring the amount of radiated energy on its communication channel. If the energy the user terminal 100 measures is low or below some predetermined threshold, it concludes no other device is transmitting. Similarly, if the energy the user terminal 100 measures is high or above some predetermined threshold, it concludes that another device is transmitting.

In the simplest case, the WLAN baseband processor 220a compares the energy in the channel with a predetermined threshold to decide whether the energy measurement is high or low. A more sophisticated technique involves the WLAN baseband processor 220a correlating the incoming signal with a Barker Sequence. When a WLAN transmission is present, the correlation measurement will peak indicating that a WLAN transmission was received. In WLAN technology, the process of determining whether the channel is occupied can be referred to as the Clear Channel Assessment mechanism.

For example, the second baseband processor 220b can be a GSM baseband processor. This system typically has no synchronization between the GSM and WLAN standards; thus, it requires high isolation between the two radios. Typically, if WLAN is transmitting and the other sub-system is receiving, WLAN transmission will leak into the second sub-systems receiver and prevent the receiver from receiving. Likewise if the second sub-system is transmitting, WLAN sub-system will not be able to receive due to the transmission leaking into the WLAN receiver.

The second baseband processor 220b can configure the user terminal 100 to communicate in a GSM communication system. The second baseband processor 220b can be configured, for example to command the energy generator 230 to generate the energy signal during the GSM receive time slots assigned to the user terminal 100. Thus, during each receive time slot, the energy generator 230 is configured to generate the energy signal, and the energy signal is coupled to the input of the WLAN baseband processor 220a via the signal combiner 240. If the WLAN baseband processor 220a monitors the WLAN input to determine if the channel is busy, the WLAN baseband processor 220a will determine, based on the energy signal, that the channel is busy and will not attempt to transmit, but instead, will reschedule the transmission.

The energy generator 230 can be configured to generate an energy signal that is sufficient in amplitude to exceed a predetermined collision avoidance threshold within the WLAN baseband processor 220a. The energy generator 230 can generate a predetermined signal that can be, for example, a periodic signal, a random signal, a pseudorandom signal, and can be an AC signal, DC signal or combination of AC and DC signals. Additionally, the energy generator 230 can be configured to generate an analog signal or a digital signal.

In one embodiment, the energy generator 230 can be configured to generate a pseudorandom signal that is a Barker code. Such an energy signal may be advantageous where the WLAN baseband processor 220a correlates the received signal with a Barker code. In such an embodiment, the energy generator 230 can be configured to generate an energy signal that will exceeds a correlation threshold within the WLAN baseband processor 220a.

The energy generator 230 can be implemented as a waveform generator. In one embodiment the energy generator 230 can be configured as a square wave generator, a sine wave generator, or some other waveform generator. In another embodiment, the energy generator 230 can be configured as a Linear Feedback Shift Register (LFSR) configured to generate a pseudorandom binary sequence. Of course, other implementations of the energy generator 230 can be used, and the disclosure is not limited by the configuration of the energy generator 230.

In a specific embodiment, the WLAN baseband processor 220a can be configured to support an IEEE 802.11 WLAN that uses a Barker code to encode at least a portion of the signal. The Barker sequence can be represented as a voltage waveform corresponding to a numeric sequence. The numeric sequence can be 1, −1, 1, 1, −1, 1, 1, 1, −1, −1, −1, and the sequence can be configured to occur within substantially a 1 millisecond period such that each element of the Barker sequence has a duration of 1/11 microsecond. Of course, other Barker sequences are known as well as other pseudorandom binary sequences, and the sequences can be generated by an energy generator 230.

Figure 3B:
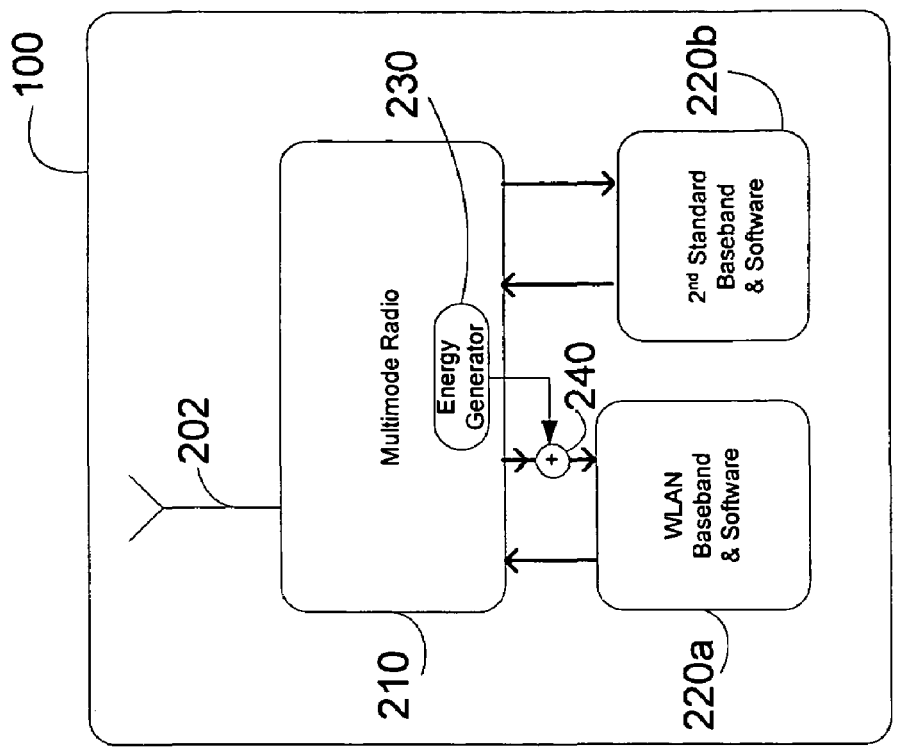
FIGS. 3A-3B are simplified functional block diagrams of embodiments of a multi-mode radio.
Figure 3A:
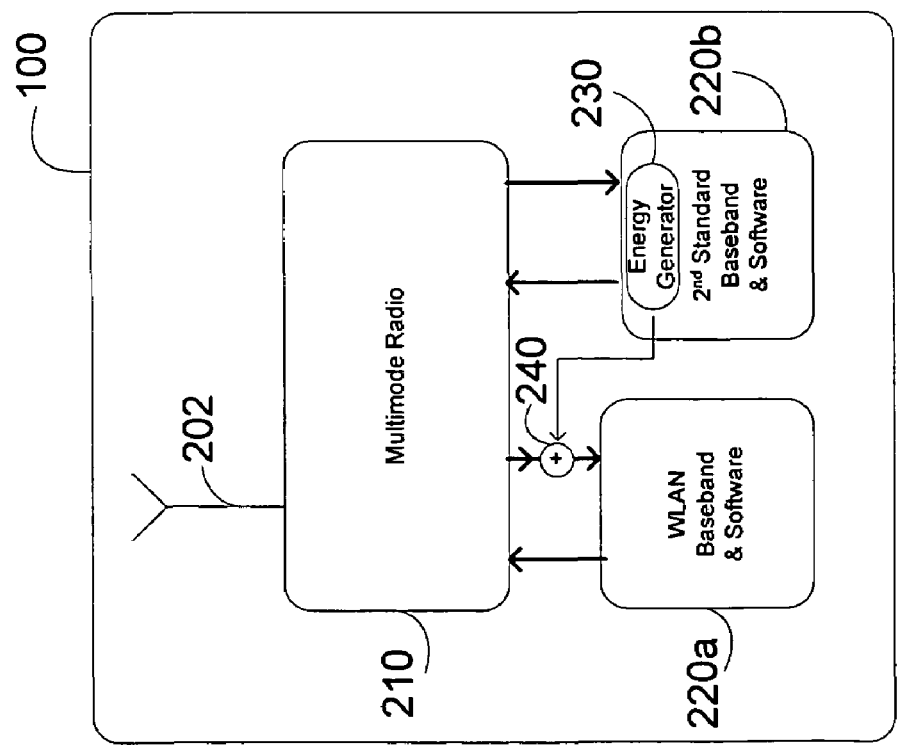

FIG. 3A is a simplified functional block diagram of another embodiment of a multimode user terminal 100 implementing WLAN synchronization through energy generation. The user terminal 100 can be the multi-mode user terminal shown in FIG. 1. The user terminal 100 embodiment of FIG. 3A shows only two baseband modules for the sake of clarity, and the disclosed methods and apparatus can easily be extended to user terminals having additional subsystems.

In this embodiment, a multi-mode radio 210 is shared between a WLAN baseband processor 220a and a second baseband processor 220b. The multi-mode radio 210 can be configured to multiplex between the supported communication standards and may be capable of only transmitting or receiving one standard at a time. Thus, the CCA mechanism can be used to prevent WLAN from transmitting when the second sub-system is receiving or transmitting, where the CCA mechanism refers to the elements and associated methods used to perform CCA.

In order for the second sub-system to prevent WLAN from transmitting, the second baseband processor 220b can inject an energy signal, such as a Barker modulated signal, into a receive input of the WLAN baseband processor 220a via the WLAN receive path. The energy signal triggers the WLAN's CCA mechanism to conclude that the channel is busy. While the channel is busy, the WLAN transmitter is inhibited and the WLAN sub-system will not attempt a transmission. In turn this lets the second sub-system receiver gain access to the radio.

The user terminal 100 includes an antenna 202, a multi-mode radio chip 210, a WLAN baseband processor 220a and a second baseband processor 220b. The antenna 202 can be configured to support multiple frequency bands corresponding to the supported communication standards. The WLAN baseband processor 220a encompasses the digital and analog baseband functionality required by the WLAN Standards committee for WLAN. The WLAN baseband processor 220a can be implemented as a single module or integrated circuit, or can be implemented as a chip set or discrete components. The WLAN baseband processor 220a can be coupled to the multi-mode radio 210 by a digital or analog transmit path and a digital or analog receive signal path. The receive signal path can include a signal combiner 240 that is configured to combine the receive signal from the multi-mode radio 210 with an energy signal generated by the second baseband processor 220b.

Likewise the second baseband processor 220b can be coupled to the multi mode radio 210 by a digital or analog transmit signal path and a digital or analog receive signal path. The second baseband processor 220b can encompass all digital and analog baseband functionality required by the second standard being implemented in the multi-mode user terminal 100.

The second baseband processor 220b includes an energy generator 230, and has a connection between the second baseband processor 220b to the WLAN receive path. In the embodiment of FIG. 3A, the second baseband processor 220b couples the energy generator 230 output to a signal combiner 240 in the WLAN receive signal path. Through this connection, the second baseband processor 220b can inject an energy signal, such as a Barker coded signal, into the receiver of the WLAN baseband processor 220a and thus trigger its CCA mechanism. By triggering its CCA mechanism, the WLAN baseband processor 220a will inhibit transmissions until the second baseband processor 220b stops injecting the Barker sequence or other energy signal. In this way, the second sub-system can access the multi-mode radio 210 to transmit and receive signals without the WLAN sub-system also attempting a transmission.

Although the descriptions of the user terminal and energy generator have generally described the energy generator as generating a baseband energy signal, the disclosure is not limited to baseband energy signals. The energy signals can be generated in the RF or Intermediate Frequency (IF) bands, although in some user terminal configurations, it may be advantageous to generate baseband energy signals. Additionally, although the embodiments generally describe the energy signal as generated by a baseband processor, the energy signal can be generated by some other element in the multi-mode user terminal, and may be generated by a corresponding radio portion or by a multi-mode radio portion. An embodiment is shown in FIG. 3B.

FIG. 3B is a simplified functional block diagram of another embodiment of a multimode user terminal 100 implementing WLAN synchronization through energy generation. The user terminal 100 can be the multi-mode user terminal shown in FIG. 1. The multi-mode user terminal 100 of FIG. 3B also shows only two baseband modules supporting two separate sub-systems, but the disclosed methods and apparatus can be extended to user terminals having additional sub-systems.

The multi-mode user terminal 100 of FIG. 3B differs from previous embodiments in that the energy generator 230 is implemented in the RF portion of the user terminal 100, and more particularly, can be implemented in an integrated circuit of a multi-mode radio 210. The user terminal 100 includes an antenna 202, a multi-mode radio portion 210, a WLAN baseband processor 220a and a second baseband processor 220b.

The multi-mode radio portion 210 can include one or more integrated circuits configured to support the multiple communication standards. Additionally, the multi-mode radio portion 210 can include an energy generator 230 having an output coupled to an input of a signal combiner 240 positioned in the receive signal path of the WLAN baseband processor 220a.

Therefore, in the configuration of FIG. 3B, the baseband processors 220a and 220b do not need to be modified to include the energy generator 230. In one embodiment, the multi-mode radio portion 210 can include multiple RF portions corresponding to multiple sub-systems supporting multiple communication standards. In such an embodiment, one or more of the RF portions can include the energy generator. In another embodiment, for example, where the user terminal 100 supports multiple communication standards in addition to the WLAN standard, instead of implementing an energy generator 230 within each of the baseband processors, for example 220b, that desire the WLAN to reschedule transmissions during the period of time that the sub-system is active, a single energy generator 230 can be implemented in a multi-mode radio portion 210.

The multi-mode radio portion 210 can determine which sub-system is active, for example, based on a frequency band of operation or some other indication of the operating mode. The multi-mode radio portion 210 can then activate the energy generator 230 to inhibit transmissions by the WLAN sub-system by triggering the CCA mechanism in the WLAN baseband processor 220a.

The signal combiner 240 can be implemented external to the multi-mode radio portion 210. In some embodiments the signal combiner 240 is implemented internal to the multi-mode radio portion 210 within the receive signal path of the signal that is configured to be coupled to the WLAN baseband processor.

Figure 4B:
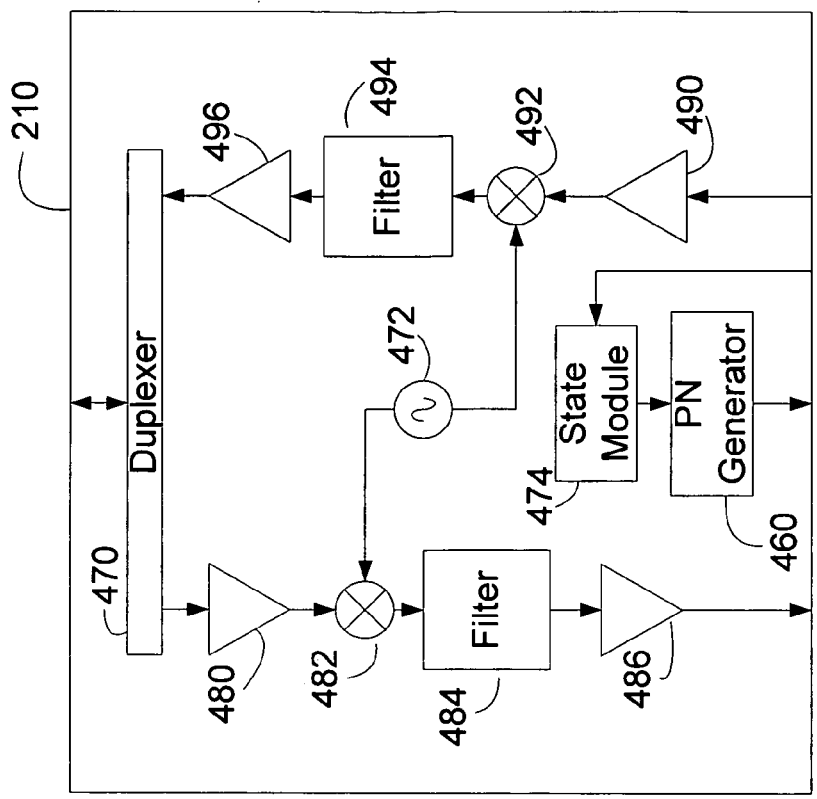
FIGS. 4A-4B are simplified functional block diagrams of embodiment of multi-mode radio elements having an energy generator.
Figure 4A:
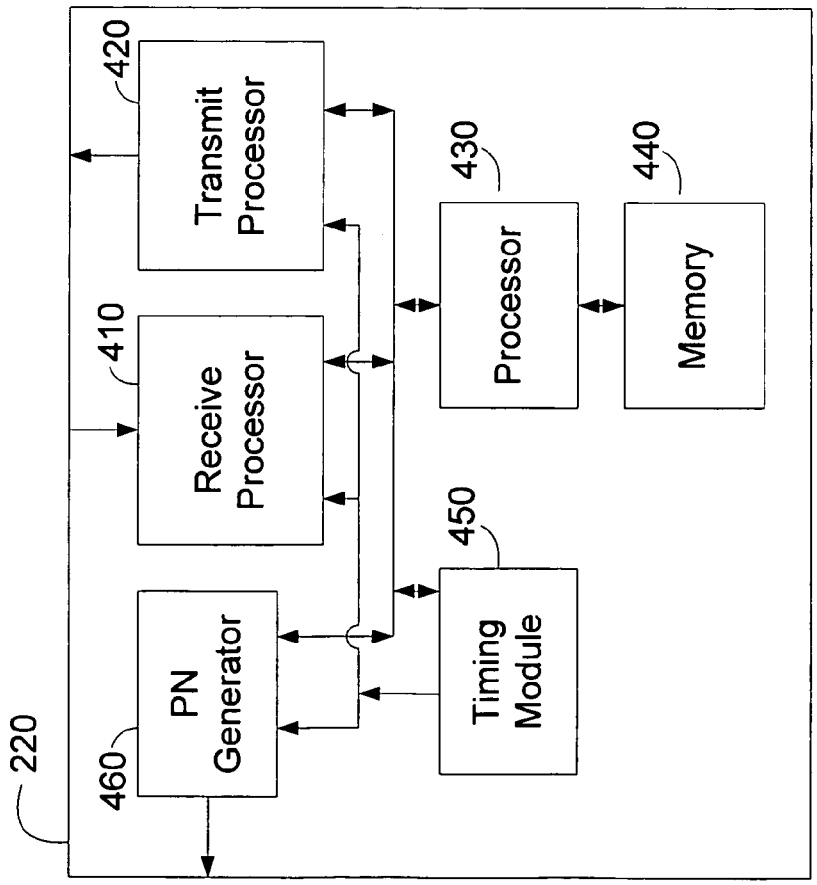

FIG. 4A is a simplified functional block diagram of an embodiment of a baseband processor 220, such as the second baseband processor of FIGS. 2 and 3A. The baseband processor 220 can be implemented as a single integrated circuit on a single semiconductor substrate, or may be implemented as multiple integrated circuits, or a combination of integrated circuits and discrete components.

The baseband processor 220 includes a receive processor 410 coupled to a receive signal input of the baseband processor 410, and a transmit processor 420 coupled to a transmit signal output of the baseband processor 220. The operation of the receive processor 410 and transmit processor 420 can be controlled, in part, by a processor 430 in communication with memory 440. In some embodiments, the processor 430 and memory 440 may be distinct circuits that are external to the remaining elements of the baseband processor 220. For example, a common processor 430 and memory 440 can be used to support the baseband processors of multiple sub-systems in a multi-mode user terminal.

The baseband processor 220 can also include a timing module 450 that can be configured to synchronize the timing of the receive processor 410 and the transmit processor 420. For example, the baseband processor 220 can be configured to support a particular time division multiplex communication standard, and the timing module 450 can be configured to synchronize the timing reference of the baseband processor 220 such that the receive processor 410 and transmit processor 420 are configured to operate at assigned time slots when the sub-system including the baseband processor 220 is active.

The timing module 450 can also be configured to control a state of an energy generator, here shown as a PN generator 460. The timing module 450 can, for example, determine when the sub-system having the baseband processor 220 is active, and can determine if the baseband processor 220 is configured for receive or transmit modes. The timing module 460 can then command the PN generator 460 to generate the PN energy signal at the appropriate times.

For example, the multi-mode user terminal may desire the WLAN transmitter be inhibited when receiving signals with the baseband processor 220. The timing module 450 can synchronize the baseband processor 220 such that the PN generator provides an energy signal during assigned receive time slots and is inhibited for all other time slots. In another example, the timing module 450 can command the PN generator 460 to provide the energy signal during assigned transmit or receive slots of the baseband processor 220. In such a situation, the WLAN sub-system, via its CCA mechanism, will inhibit transmission during transmit and receive slots of the sub-system generating the PN energy signal.

FIG. 4B is a simplified functional block diagram of an embodiment of a multi-mode radio portion 210, such as the multi-mode radio portion shown in FIG. 3B. The multi-mode radio portion 210 can be implemented as a single integrated circuit on a single semiconductor substrate, or may be implemented as multiple integrated circuits, or a combination of integrated circuits and discrete components. Implementing the multi-mode radio portion 210 as a single integrated circuit can reduce the complexity and overall size of the multi-mode user terminal. Although a multi-mode radio portion 210 is described, the radio portion can be configured to support a single communication standard, and thus can be configured as a radio portion for a single sub-system.

The multi-mode radio portion 210 includes an RF interface that can be coupled to an antenna. The RF interface is also coupled to the transmit and receive signal paths within the multi-mode radio portion 210. The RF interface can couple to a duplexer 470. The duplexer 470 can be configured to couple received signals to the receive signal path and can be configured to couple the transmit signals from the transmit signal path to the RF interface. The duplexer 470 can also provide signal isolation between the transmit and receive signal paths. The duplexer 470 is shown as coupled to a single receive signal path and a single transmit signal path. However, the receive and transmit single paths can represent multi-mode signal paths that may be separate and distinct parallel signal paths or some combination of common and parallel signal paths.

The receive signal path includes a receive amplifier module 480 that can be, for example, a Low Noise Amplifier (LNA) module. The receive amplifier module can be a single LNA configured to support multiple communication bands corresponding to multiple communication systems, or can be a configuration of multiple amplifiers configured to support the multiple communication standards. The output of the receive amplifier module 480 can be coupled to an input of a frequency conversion module, depicted here as a mixer 482.

The mixer 482 can be configured to frequency convert the received signals down to baseband or IF, depending on the sub-system configuration. The mixer 482 can receive a Local Oscillator (LO) signal from an LO module 472. The frequency of the LO and of the received signal can determine the frequency of the frequency converted signal. The output of the mixer 482 can be coupled to a filter 484.

The filter 484 can be configured to remove or substantially attenuate the undesired mixer products, and can be configured to filter the received signal to a predetermined bandwidth. The bandwidth of the filter 484 can be programmable, and can be programmed to bandwidths based on the supported communication system. The output of the filter 484 can be coupled to a receive low frequency amplifier module 486.

The receive low frequency amplifier module 486 can be an IF or baseband amplifier module that is configured to amplify the downconverted and filtered receive signals. The output of the receive low frequency amplifier module 486 can be coupled to a receive signal output of the multi-mode radio portion 210. In other embodiments, the output of the receive low frequency amplifier module 486 can be coupled to an analog to digital converter (not shown) that is configured to convert the received signals to a digital representation prior to outputting the signal.

The transmit signal path operates in a complementary manner to the receive signal path. A baseband or IF signal can be received at a transmit path input. The multi-mode radio portion 210 of FIG. 4B is configured to accept an analog transmit signal. However, the transmit signal can be an analog or digital signal, and if the transmit signal is a digital signal, the multi-mode radio portion 210 can include a digital to analog converter (not shown) that converts the transmit signal from a digital representation to an analog representation.

The transmit signal is coupled to a transmit low frequency amplifier module 490 that amplifies the transmit signal. The output of the transmit low frequency amplifier module 490 can be coupled to a frequency converter, here shown as a mixer 492. The mixer 492 can be configured to upconvert the transmit signal to an appropriate RF frequency based on the supported communication system.

The LO module 472 can be configured to provide an LO signal for the mixer 492. Although the LO module 472 is shown with a single LO output, the LO module can be configured as multiple oscillators, and each oscillator output can be coupled to a distinct frequency converter.

The upconverted output from the mixer 492 can be coupled to a filter 494 that can be configured to remove the undesired mixer signal components. The output of the filter 494 can be coupled to a High Power Amplifier (HPA) module 496 that can include one or more amplifiers configured to support the multiple operating bands corresponding to the multiple supported communication systems. The output of the HPA module 496 can be coupled to the duplexer 470 and from the duplexer 470 to the RF interface of the multi-mode radio portion 210.

The multi-mode radio portion 210 can also include a state module 474 that can be configured to determine a state of the multi-mode radio portion 210. The state module 474 can be configured to determine, for example, a communication system being supported by the multi-mode radio portion 210, a transmit state, a receive state, an idle state, and the like, or some other state that the multi-mode radio portion 210 may be in.

The state module 474 can determine the state based on external inputs. The external inputs may be dedicated to the state module 474 or may be the external inputs configured to program one or more of the programmable modules within the multi-mode radio portion 210. The state module 474 can determine the state of the multi-mode radio portion 210, for example, based on an operating frequency, a programmable filter bandwidth, an LO frequency, some other programmable value, and the like, or some combination of the factors.

The multi-mode radio portion 210 can also include an energy generator, here shown as a PN generator 460, that can be configured to generate and energy signal and couple the energy signal to an energy signal output of the multi-mode radio portion 210. The state module 474 can be configured to control the operation of the PN generator 460 or other energy generator. As described earlier, the PN generator can be configured to generate a Barker sequence or a signal that is at least partially encoded, modulated, or otherwise modified using the Barker sequence.

In one embodiment, the state module 474 can be configured to compare the state of the multi-mode radio portion 210 against a predetermined list of states to determine whether to activate the PN generator 460. For example, if the state module 474 determines that the multi-mode radio portion 210 is configured to support GSM communications, the state module 474 can activate the PN generator 460 such that the WLAN sub-system does not attempt to transmit WLAN information during the time GSM communications is active.

Figure 5:
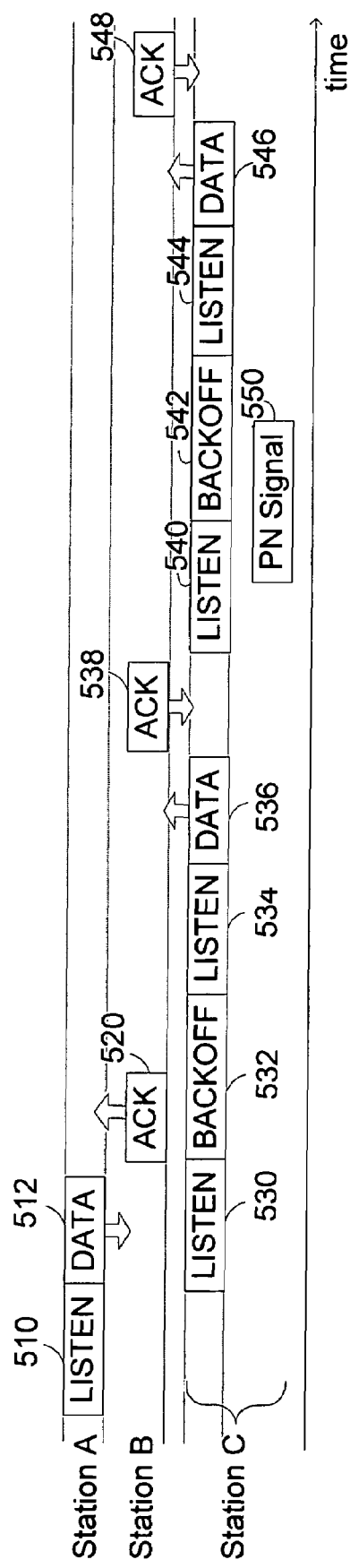
FIG. 5 is a simplified timing diagram of communications using the multi-mode radio.

FIG. 5 is an example of a simplified timing diagram of communications using the multi-mode radio. The timing diagram illustrates WLAN communications between three distinct WLAN terminals over a shared WLAN channel. In the example of FIG. 5, the first WLAN terminal, Station A, can represent a WLAN device, the second WLAN terminal, Station B, can represent an access point, and the third WLAN terminal, Station C, can represent the multi-mode user terminal. In the functional block diagram of FIG. 1, Station A can correspond to the multi-mode user terminal, Station B can correspond to the access point, and Station A can correspond to a WLAN device that is not shown.

The transmission sequence begins with Station A listening during a LISTEN period 510 to the channel for a period of time. If Station A determines the channel is clear, it transmits a DATA frame 512 or packet to Station B. Station B then acknowledges the reception by sending an ACK message 520. The LISTEN period 510 represent the period in which the user terminal performs the CCA process in which the WLAN device correlates the incoming signal with a Barker Sequence, or otherwise determines the channel is occupied.

During Station A's DATA frame 512 transmission, Station C generates information to send to Station B. Before Station C transmits, it first listens to the channel during a LISTEN period 530. In the case illustrated in FIG. 5, the channel is busy with Station A's DATA transmission 512 during the Station C LISTEN period 530. Therefore Station C, postpones its transmission in what is referred to in WLAN communications as a BACKOFF period 532. During Station's C LISTEN period 530 and BACKOFF period 532, Station A completes its DATA frame 512 transmission and Station B acknowledges a successful reception with an ACK frame 520.

At the conclusion of the Station C BACKOFF period 532, Station C again listens to the channel in a LISTEN period 534 to determine if the channel is busy. If the channel is not busy, Station C can transmit its DATA frame 536 to Station B. Station B can respond with an ACK frame 538 if the information was transferred successfully.

A collision event caused by multiple stations competing for a shared network usually occurs at the beginning of transmission. Because the Medium Access Protocol indicates to stations on the network that the medium is free at approximately the same time, any stations with pending transmissions will begin to transmit at approximately the same time. When this occurs, the resulting transmissions will have a collision event that physically begins at or near the beginning of the transmission. However, the transmitting device is unaware of the occurrence of the collision until it has completed its attempt to transmit the DATA frame, and does not receive the expected ACK frame. Thus, the collision event cannot be detected until the end of the transmission attempt. The longer the DATA frame, the longer it will take for the transmitting station to determine that the collision event has occurred. Upon detection of a collision, the stations will each wait a random time before attempting to transmit the DATA frame again. Each time a DATA frame fails transmission, the average random time waited will be increased in an exponential fashion before attempting retransmission.

Station C may again desire to transmit information to Station B. However, a separate sub-system in Station C may be active. For example, a second sub-system operating over a GSM communication system may be assigned a receive slot and it may be advantageous to inhibit the WLAN transmissions in Station C to minimize interference coupling to the GSM receive signal path.

Station C listens to the channel during a LISTEN period 540. However, a second sub-system within Station C can generate a PN Signal 550 and couple the signal to the receive signal path of the WLAN sub-system within Station C. In one embodiment, the second sub-system can generate the PN Signal 550 and couple the signal to a receive signal input of the WLAN baseband processor. In another embodiment, the second sub-system can generate the PN Signal 550 as an IF or RF signal that is coupled to the corresponding IF or RF receive signal path of the WLAN sub-system.

Station C thus determines that the channel is busy, although the channel may in fact be unoccupied. Station C thus utilizes the PN Signal 550 to inhibit transmission by the WLAN sub-system and to cause the WLAN sub-system to reschedule the transmission.

Station C delays the WLAN transmission by a BACKOFF period 542. At the conclusion of the Station C BACKOFF period 542, Station C again listens to the channel in a LISTEN period 544 to determine if the channel is busy. In the example illustrated in FIG. 5, the second sub-system in Station C is complete and inhibits or otherwise ceases coupling of the energy signal to allow the WLAN sub-system to acquire the channel.

If the channel is not busy, Station C can transmit its DATA frame 546 to Station B. Station B can respond with an ACK frame 548 if the information was transferred successfully.

Figure 6:
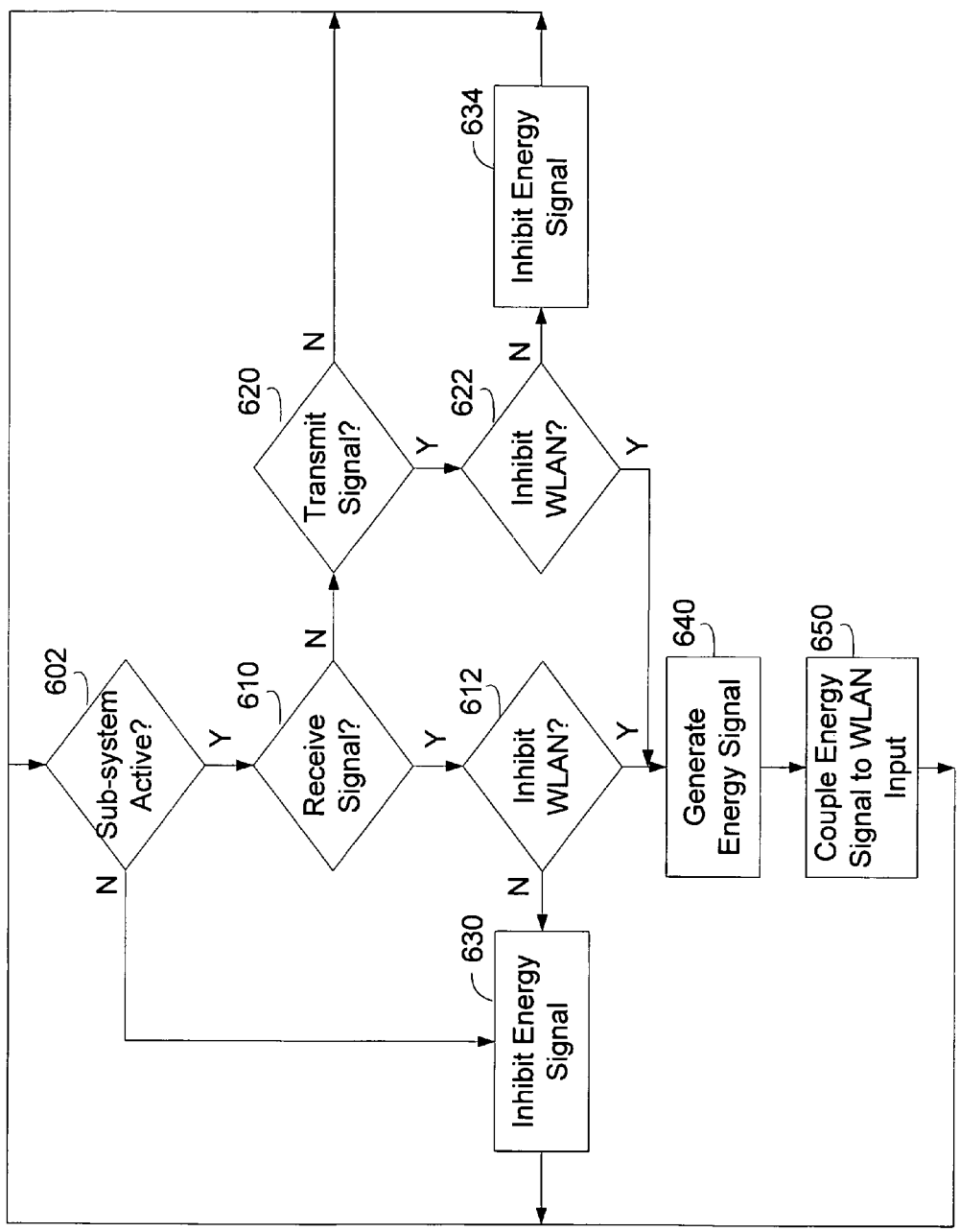
FIG. 6 is a simplified flowchart of an embodiment of synchronizing WLAN communications in a multi-mode radio.

FIG. 6 is a simplified flowchart of an embodiment of a method 600 of synchronizing WLAN communications in a multi-mode radio. The method 600 can be implemented in a multi-mode wireless device, such as the user terminals shown in FIGS. 1-3. In particular, the method 600 can be implemented within a particular sub-system of the multi-mode wireless device to inhibit or otherwise reschedule the transmissions in a WLAN sub-system. The sub-system can be, for example a GSM sub-system or some other wireless communication sub-system.

The method 600 begins at decision block 602 where the sub-system determines if communication over its supported system is presently active. The sub-system may be active when the sub-system is engaged in an active communication session in the corresponding communication system. For example, a GSM sub-system may be considered active when the GSM sub-system is engaged in an active traffic channel communication. If so, the sub-system proceeds to decision block 610. However, if the sub-system is not active, there is no need to inhibit the WLAN sub-system, Thus, the sub-system proceeds from decision block 602 to block 630 and ensures that the energy signal is inhibited or otherwise inactive. The sub-system then returns to the input of the decision block 602 and continues to monitor for activity in the sub-system.

At decision block 610, the sub-system determines if it is scheduled to receive signals from its corresponding supported system. If so, the sub-system proceeds to decision block 612 to determine if transmission in the WLAN sub-system should be inhibited. If not, the sub-system proceeds to block 630 and inhibits or otherwise inactivates the energy signal. The sub-system then returns to the input of the decision block 602.

Returning to decision block 612, if the sub-system determines that the transmission in the WLAN sub-system should be inhibited, the sub-system proceeds to block 640.

Returning to decision block 610, if the sub-system determines that the sub-system is not scheduled to receive signals, the sub-system proceeds to decision block 620 to determine if the sub-system is scheduled to transmit signals. If not, the sub-system may be in an idle state, and returns to decision block 602 to continue to monitor the sub-system.

If, at decision block 620, the sub-system determines that the sub-system is scheduled to transmit signals, the sub-system proceeds to decision block 622 and determines if the WLAN transmission should be inhibited. For example, the multi-mode wireless device can use a multi-mode radio and may not be able to support multiple sub-system transmissions at different frequencies.

If at decision block 622, the sub-system determines that the WLAN does not need to be inhibited, the sub-system proceeds to block 634 and inhibits or otherwise inactivates the energy signal. The sub-system then returns to the input of the decision block 602.

If, at decision block 622, the sub-system determines that the transmission in the WLAN sub-system should be inhibited, the sub-system proceeds to block 640. Thus, the sub-system may proceed to block 640 if the sub-system determines that the WLAN transmission is to be inhibited due to either scheduled transmission or reception in the sub-system.

In block 640, the sub-system generates an energy signal, which can be a periodic signal, random signal, pseudorandom signal, or some other type of energy signal. The sub-system then proceeds to block 650 and couples the energy signal to a WLAN receive path input to inhibit the WLAN transmission. The sub-system then proceeds back to decision block 602 to continue to monitor the sub-system activity.

Methods and apparatus have been disclosed to allow a multi-mode wireless device to synchronize the transmissions of a WLAN sub-system in order to minimize interference in other sub-systems attributable to the WLAN transmission. A second sub-system, distinct from the WLAN sub-system can determine that it is active and that the WLAN transmission should be inhibited or otherwise rescheduled. The second sub-system can generate an energy signal that is coupled to the receive path of the WLAN sub-system to cause the CCA mechanism in the WLAN sub-system to inhibit or otherwise reschedule any WLAN transmission. The energy signal can be a signal of an amplitude sufficient to exceed a predetermined CCA threshold in the WLAN sub-system. In another embodiment, the energy signal can be encoded or otherwise modulated using a predetermined sequence such that the energy signal exceeds a predetermined correlation CCA threshold in the WLAN sub-system.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of controlling a multi-mode wireless communication device, the method comprising:
    generating an energy signal in a first sub-system of the multi-mode wireless communication device, the first sub-system configured to enable the multi-mode wireless communication device to communicate with a first wireless communication system;
    combining the energy signal with a received signal from a Wireless Local Area Network (WLAN) sub-system to generate a combined signal; and
    coupling the combined signal to a receive signal path of the WLAN sub-system within the multi-mode wireless communication device to control the multi-mode wireless communication device, the WLAN sub-system implementing collision avoidance.

2. The method of claim 1, wherein generating the energy signal in the first sub-system comprises generating a signal having an amplitude sufficient to exceed a predetermined threshold in the WLAN sub-system.

3. The method of claim 1, wherein generating the energy signal in the first sub-system comprises generating a signal configured to exceed a correlation threshold in the WLAN sub-system.

4. The method of claim 1, wherein generating the energy signal in the first sub-system comprises generating a signal encoded with a Barker sequence used in the WLAN sub-system.

5. The method of claim 4, wherein the signal encoded with the Barker sequence uses a Barker sequence 1, −1, 1, 1, −1, 1, 1, 1, −1, −1, −1 occurring substantially within a 1 millisecond time period.

6. The method of claim 1, wherein coupling the combined signal to the receive signal path comprises coupling a baseband energy signal to a receive input of a baseband portion of the WLAN sub-system.

7. The method of claim 1, wherein coupling the combined signal to the receive signal path comprises coupling an RF energy signal to an RF receive signal path of the WLAN sub-system.

8. The method of claim 1, wherein generating the energy signal in the first sub-system comprises:
    determining a time that the first sub-system is active;
    determining a time that the first sub-system is receiving wireless signals from the first wireless communication system; and
    generating the energy signal during the time that the first sub-system is receiving.

9. The method of claim 1, wherein generating the energy signal in the first sub-system comprises:
    determining a time that the first sub-system is active;
    determining a time that the first sub-system is transmitting wireless signals to the first wireless communication system; and
    generating the energy signal during the time that the first sub-system is transmitting.

10. A method of controlling a multi-mode wireless communication device, the method comprising:
    determining a time that a first sub-system is active, the first sub-system configured to enable the multi-mode wireless communication device to communicate with a first wireless communication system;
    generating an energy signal in a baseband portion of the first sub-system during at least a portion of the time that the first sub-system is active, the energy signal configured to exceed a predetermined Clear Channel Assessment (CCA) threshold;
    combining the energy signal with a received signal from a Wireless Local Area Network (WLAN) sub-system to generate a combined signal; and
    coupling the combined signal to a receive signal path of a baseband portion of the WLAN sub-system within the multi-mode wireless communication device to control the multi-mode wireless communication device, the WLAN sub-system implementing collision avoidance based on the CCA threshold.

11. The method of claim 10, further comprising configuring a multi-mode RF portion of the multi-mode wireless communication device for the first wireless communication system during the portion of time that the first sub-system is active and the energy signal is generated.

12. The method of claim 10, wherein the energy signal comprises a baseband signal selected from the group comprising a periodic signal, a random signal, a pseudorandom signal, or a combination thereof.

13. The method of claim 10, wherein the energy signal comprises a baseband signal at least a portion of which is encoded using a Barker sequence used in the WLAN sub-system.

14. The method of claim 10, wherein the first wireless communication system comprises a GSM telephone system.

15. The method of claim 10, wherein the WLAN sub-system is configured to support communications in accordance with an IEEE 802.11 standard.

16. A multi-mode wireless communication apparatus, the apparatus comprising:
    a radio portion;
    a Wireless Local Area Network (WLAN) baseband portion coupled to the radio portion and configured to determine a transmit channel availability using a Clear Channel Assessment (CCA) mechanism;
    a sub-system baseband portion coupled to the radio portion and configured to support communications over a wireless communication system, the sub-system baseband portion distinct from the WLAN baseband portion, and configured to determine a time that communications with the wireless communication system is active, generate an energy signal during at least a portion of the time that communications with the wireless communication system is active, and couple the energy signal to a receive input of the WLAN baseband portion; and
    a signal combiner having a first input coupled to a WLAN receive output of the radio portion, a second input coupled to a energy generator output of the sub-system baseband portion, and an output coupled to the receive input of the WLAN baseband portion.

17. The apparatus of claim 16, wherein the radio portion comprises:
- a WLAN radio portion coupled to the WLAN baseband portion and configured to communicate with a WLAN communication system; and
- a sub-system RF portion coupled to the sub-system baseband portion and configured to communicate with the wireless communication system.

18. The apparatus of claim 16, wherein the radio portion comprises a multimode radio portion configured to support in a time multiplex manner a WLAN communication system and the wireless communication system.

19. The apparatus of claim 16, wherein the CCA mechanism of the WLAN baseband portion monitors a signal at the receive input of the WLAN baseband portion and determines that a WLAN channel is busy if the signal exceeds a predetermined threshold.

20. The apparatus of claim 19, wherein the predetermined threshold comprises a predetermined signal power.

21. The apparatus of claim 19, wherein the predetermined threshold comprises a predetermined correlation threshold.

22. The apparatus of claim 16, wherein the energy signal generated by the sub-system baseband portion comprises a pseudorandom baseband signal.

23. The apparatus of claim 16, wherein the energy signal generated by the sub-system baseband portion comprises a baseband signal encoded with a Barker sequence used in the WLAN baseband portion.

24. The apparatus of claim 16, wherein the sub-system baseband portion comprises:
- a timing module configured to determine a time period in which the multi-mode wireless communication apparatus is configured to transmit or receive signals with the wireless communication system; and
- an energy generator coupled to the timing module and configured to generate the energy signal during at least a portion of the time period.

25. A multi-mode wireless communication apparatus, the apparatus comprising:
- a radio portion configured to generate an energy signal based on an operating state of the radio portion and output the energy signal at an energy signal output;
- a Wireless Local Area Network (WLAN) baseband portion having a receive signal input coupled to the radio portion and energy signal output, and configured to support communications with a WLAN communication system and to determine a transmit channel availability using a Clear Channel Assessment (CCA) mechanism;
- a sub-system baseband portion coupled to the radio portion and configured to support communications with a wireless communication system distinct from the WLAN communication system; and
- a signal combiner having a first input coupled to a receive signal output of the radio portion, a second input coupled to the energy signal output, and an output of the signal combiner coupled to the receive signal input of the WLAN baseband portion.

* * * * *